United States Patent
Larson et al.

(10) Patent No.: US 10,929,761 B2
(45) Date of Patent: Feb. 23, 2021

(54) SYSTEMS AND METHODS FOR AUTOMATICALLY DETECTING AND REPAIRING SLOT ERRORS IN MACHINE LEARNING TRAINING DATA FOR A MACHINE LEARNING-BASED DIALOGUE SYSTEM

(71) Applicant: Clinc, Inc., Ann Arbor, MI (US)

(72) Inventors: Stefan Larson, Ann Arbor, MI (US); Anish Mahendran, Ann Arbor, MI (US); Parker Hill, Ann Arbor, MI (US); Jonathan K. Kummerfeld, Ann Arbor, MI (US); Michael A. Laurenzano, Ann Arbor, MI (US); Lingjia Tang, Ann Arbor, MI (US); Jason Mars, Ann Arbor, MI (US)

(73) Assignee: Clinic, Inc., Ann Arbor, MI (US)

(*) Notice: Subject to any disclaimer, the term of this patent is extended or adjusted under 35 U.S.C. 154(b) by 0 days.

(21) Appl. No.: 16/895,147

(22) Filed: Jun. 8, 2020

(65) Prior Publication Data
US 2020/0401914 A1   Dec. 24, 2020

Related U.S. Application Data

(60) Provisional application No. 63/000,000, filed on Mar. 26, 2020, provisional application No. 62/978,933, filed on Feb. 20, 2020, provisional application No. 62/864,705, filed on Jun. 21, 2019.

(51) Int. Cl.
*G06N 5/04* (2006.01)
*G06N 20/00* (2019.01)

(52) U.S. Cl.
CPC ............ *G06N 5/04* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 9,697,192 B1 | * | 7/2017 | Estes | G06F 40/211 |
| 2016/0314106 A1 | * | 10/2016 | Carrier | G06F 40/189 |

OTHER PUBLICATIONS

Dickinson et al. ("Error Detection and Correction in Annotated Corpora"). (Year: 2005).*

* cited by examiner

*Primary Examiner* — Alexey Shmatov
*Assistant Examiner* — Hansol Doh
(74) *Attorney, Agent, or Firm* — Padowithz Alce

(57) ABSTRACT

Systems and methods for automatically detecting annotation discrepancies in annotated training data samples and repairing the annotated training data samples for a machine learning-based automated dialogue system include evaluating a corpus of a plurality of distinct training data samples; identifying one or more of a slot span defect and a slot label defect of a target annotated slot span of a target training data sample of the corpus based on the evaluation; and automatically correcting one or more annotations of the target annotated slot span based on the identified one or more of the slot span defect and the slot label defect.

19 Claims, 4 Drawing Sheets

200

Sourcing Training Data Samples S210

Identifying Inconsistent or Erroneous Slot Format S220

Deriving or Building a Slot Span Format Evaluator S230

Identifying Inconsistent or Erroneous Slot Labels S240

Implementing a Variation N-Gram Method S250

Synthesizing Slot Format and Slot Label Evaluation S260

200

```
┌─────────────────────────────────────────────────────────┐
│         Sourcing Training Data Samples S210             │
└─────────────────────────────────────────────────────────┘
```

| Identifying Inconsistent or Erroneous Slot Format S220 |

| Deriving or Building a Slot Span Format Evaluator S230 |

| Identifying Inconsistent or Erroneous Slot Labels S240 |

| Implementing a Variation N-Gram Method S250 |

```
┌─────────────────────────────────────────────────────────┐
│    Synthesizing Slot Format and Slot Label Evaluation S260 │
└─────────────────────────────────────────────────────────┘
```

FIGURE 2

SYSTEMS AND METHODS FOR AUTOMATICALLY DETECTING AND REPAIRING SLOT ERRORS IN MACHINE LEARNING TRAINING DATA FOR A MACHINE LEARNING-BASED DIALOGUE SYSTEM

CROSS-REFERENCE TO RELATED APPLICATIONS

This application claims the benefit of U.S. Provisional Application No. 62/864,705, filed 21 Jun. 2019, U.S. Provisional Application No. 62/978,933, filed 20 Jun. 2020, U.S. Provisional No. 63/000,000, filed, 26 Mar. 2020, which are incorporated herein in their entireties by this reference.

GOVERNMENT RIGHTS

The subject matter of the invention may be subject to U.S. Government Rights under National Science Foundation grants: NSF SBIR Phase 1 Grant-1622049 and NSF SBIR Phase 2 Grant-1738441.

TECHNICAL FIELD

The inventions herein relate generally to the machine learning and artificially intelligent dialogue systems fields, and more specifically to new and useful systems and methods for intelligently implementing machine learning models of a machine learning-based conversational service in the machine learning field.

BACKGROUND

Modern virtual assistants and/or online chatbots may typically be employed to perform various tasks or services based on an interaction with a user. Typically, a user interacting with a virtual assistant may pose a question or otherwise submit a command to the virtual assistant to which the virtual assistant may provide a response or a result. Many of these virtual assistants may be implemented using a rules-based approach, which typically requires coding or preprogramming many or hundreds of rules that may govern a manner in which the virtual assistant should operate to respond to a given query or command from a user.

While the rules-based approach for implementing a virtual assistant may be useful for addressing pointed or specific queries or commands made by a user, the rigid or finite nature of this approach severely limits a capability of a virtual assistant to address queries or commands from a user that exceed the scope of the finite realm of pointed and/or specific queries or commands that are addressable by the finite set of rules that drive the response operations of the virtual assistant.

That is, the modern virtual assistants implemented via a rules-based approach for generating responses to users may not fully satisfy queries and commands posed by a user for which there are no predetermined rules to provide a meaningful response or result to the user.

Additionally, while machine learning enhances capabilities of artificially intelligent conversational systems, inefficiencies continue to persist in training the underlying machine learning models performing classification and predictive functions of the artificially intelligent conversation systems.

Therefore, there is a need in the machine learning field for systems and methods that enable rapid and efficient training of machine learning models and for a flexible virtual assistant solution that is capable of evolving beyond a finite set of rules for effectively and conversantly interacting with a user. The embodiments of the present application described herein provide technical solutions that address, at least, the need described above, as well as the deficiencies of the state of the art described throughout the present application.

SUMMARY OF THE INVENTION(S)

In one embodiment, a method for automatically detecting annotation discrepancies in annotated training data samples and repairing the annotated training data samples for a machine learning-based automated dialogue system includes: evaluating a corpus of a plurality of distinct training data samples; identifying one or more of a slot span defect and a slot label defect of a target annotated slot span of a target training data sample of the corpus based on the evaluation; and automatically correcting one or more annotations of the target annotated slot span based on the identified one or more of the slot span defect and the slot label defect.

In one embodiment, automatically correcting the one or more annotations of the target annotated slot span includes one of: automatically expanding the target annotated slot span to include one or more surrounding tokens based on identifying the slot span defect; and automatically contracting the target annotated slot span to exclude one or more tokens within the annotated slot span based on detecting the slot span defect.

In one embodiment, automatically correcting the one or more annotations of the target annotated slot span includes one or more of: deleting one or more erroneous slot labels from the target annotated slot span based on identifying the slot label defect, and annotating to the target annotated slot span a proper slot label based on slot labels applied to a majority of like slot spans within the corpus.

In one embodiment, the slot span defect relates to an error or an inconsistency in a setting of a length of a given annotated slot span of a given training data sample, wherein the length of the given annotated slot span is set such that the given annotated slot span erroneously includes one or more extraneous tokens or erroneously excludes one or more pertinent tokens of the given training data sample.

In one embodiment, the slot label defect relates to an error or an inconsistency in an application of one or more distinct slot classification labels to a given annotated slot span of a given training data sample.

In one embodiment, the method includes constructing a slot span format evaluator for the target annotated slot span based on span format attributes of one or more of the plurality of distinct training data samples of the corpus, wherein constructing the slot span format evaluator includes: defining a left- and right n-gram set for a slot type of the target annotated slot span, wherein the slot type relates to one of a plurality of distinct slot classification labels.

In one embodiment, a given left n-gram set of the left- and right n-gram set comprises a set of token sequences that excludes a last token in an n-gram, a given right n-gram set of the left- and right n-gram sets comprises a set of token sequences that excludes the first token in the n-gram, and the n-gram is a sequence of tokens of a given training data sample within the corpus of annotated training samples.

In one embodiment, evaluating the corpus of the plurality of distinct training data samples includes iterating the slot format evaluator over each of the plurality of distinct training data samples within the corpus, wherein iterating the slot format evaluator includes: identifying whether a segment of a given annotated slot span of a given training data sample is positioned adjacent to an un-labeled span of the given training data sample having a member token within the left- and right n-gram set for a slot type of the given annotated training data sample; and if the segment of a given annotated slot span is adjacent to the un-labeled span that includes the member token, identifying the member token as a candidate for inclusion into the given annotated slot span.

In one embodiment, evaluating the corpus of the plurality of distinct training data samples includes: implementing a voting stage that informs a candidate exclusion policy or a candidate inclusion policy for the member token, wherein the voting stage includes:

identifying candidate-slot pairs from within the corpus, wherein each candidate-slot pair includes a pairing of the member token with an adjacent token as found throughout distinct training data samples within the corpus, wherein the voting stage informs the candidate inclusion policy if a majority of candidate-slot pairs occur labeled as part of a single slot span thereby adding the member token to the given annotated slot span.

In one embodiment, the method includes designating the given annotated slot span as an archetypal slot span for the slot type of the target annotated slot span, and identifying whether the target annotated slot span includes the slot span defect is based on a comparison of the target annotated slot span to the archetypal slot span.

In one embodiment, evaluating the corpus of the plurality of distinct training data samples includes iterating the slot format evaluator over each of the plurality of distinct training data samples within the corpus, wherein iterating the slot format evaluator includes: identifying whether a given annotated slot span is positioned adjacent to an un-labeled span not having a member token within the left- and right n-gram set for a slot type of the given annotated slot span; and if the given annotated slot span is adjacent to the un-labeled span that does not include the member token, identifying a token within the given annotated slot span that is adjacent to the un-labeled slot span as a candidate for exclusion from the given annotated slot span.

In one embodiment, evaluating the corpus of the plurality of distinct training data samples includes: implementing a voting stage that informs a candidate exclusion policy or a candidate inclusion policy for the member token, wherein the voting stage includes: identifying candidate-slot pairs from within the corpus, wherein each candidate-slot pair includes a pairing of the member token with an adjacent token as found throughout the plurality of distinct training data samples within the corpus, wherein the voting stage informs the candidate exclusion policy if a majority of candidate-slot pairs do not occur labeled as part of a single annotated slot span thereby excluding the member token from the given annotated slot span.

In one embodiment, the method includes designating the given annotated slot span as an archetypal slot span for the slot type of the target annotated slot span, and identifying whether the target annotated slot span includes the slot span defect is based on a comparison of the target annotated slot span to the archetypal slot span.

In one embodiment, the method includes implementing a label variation evaluator, wherein the label variation evaluator includes a variation n-gram that identifies whether there is the slot label defect in the given annotated training data sample, wherein implementing the label variation evaluator includes: (1) setting the given annotated slot span as a slot nucleus; (2) setting a fixed radius, k, around the nucleus, where k is a predetermined number of tokens; and (3) identify all variation n-grams for the given training sample based on the slot nucleus and fixed radius, k, wherein each identified variation n-gram includes an n-gram that includes a combination of the slot nucleus and one or more tokens surrounding the slot nucleus within a given training data sample.

In one embodiment, the method includes implementing a voting stage that identifies whether a standard labeling convention for the variation n-gram exists within the corpus of annotated training sample data, wherein the standard labeling convention exists if a majority of annotated training data samples having the variation n-gram within the corpus include a distinct slot classification label, wherein if the standard labeling convention exists, the label variation evaluator determines whether the slot label annotated to the given training data sample is defective.

In one embodiment, if the slot label annotated to the given training data sample is defective, automatically repairing an annotation of the given annotated slot span to remove the slot label and ascribe a new slot label defined by the standard labeling convention to the given annotated slot span.

In one embodiment, the slot span defect includes one or more identified slot span defect types including one or more of: an omission inconsistency; and an addition inconsistency.

In one embodiment, automatically correcting the one or more annotations of the target annotated slot span is further based on the one or more identified slot span defect types.

In one embodiment, the slot label defect includes one or more identified slot label defect types including one or more of: a wrong label inconsistency; a swapped label inconsistency; and a chop and join inconsistency.

In one embodiment, automatically correcting the one or more annotations of the target annotated slot span is further based on the one or more identified slot label defect types.

BRIEF DESCRIPTION OF THE FIGURES

FIG. 2 illustrates an example method in accordance with one or more embodiments of the present application.

DESCRIPTION OF THE PREFERRED EMBODIMENTS

Figure 1:
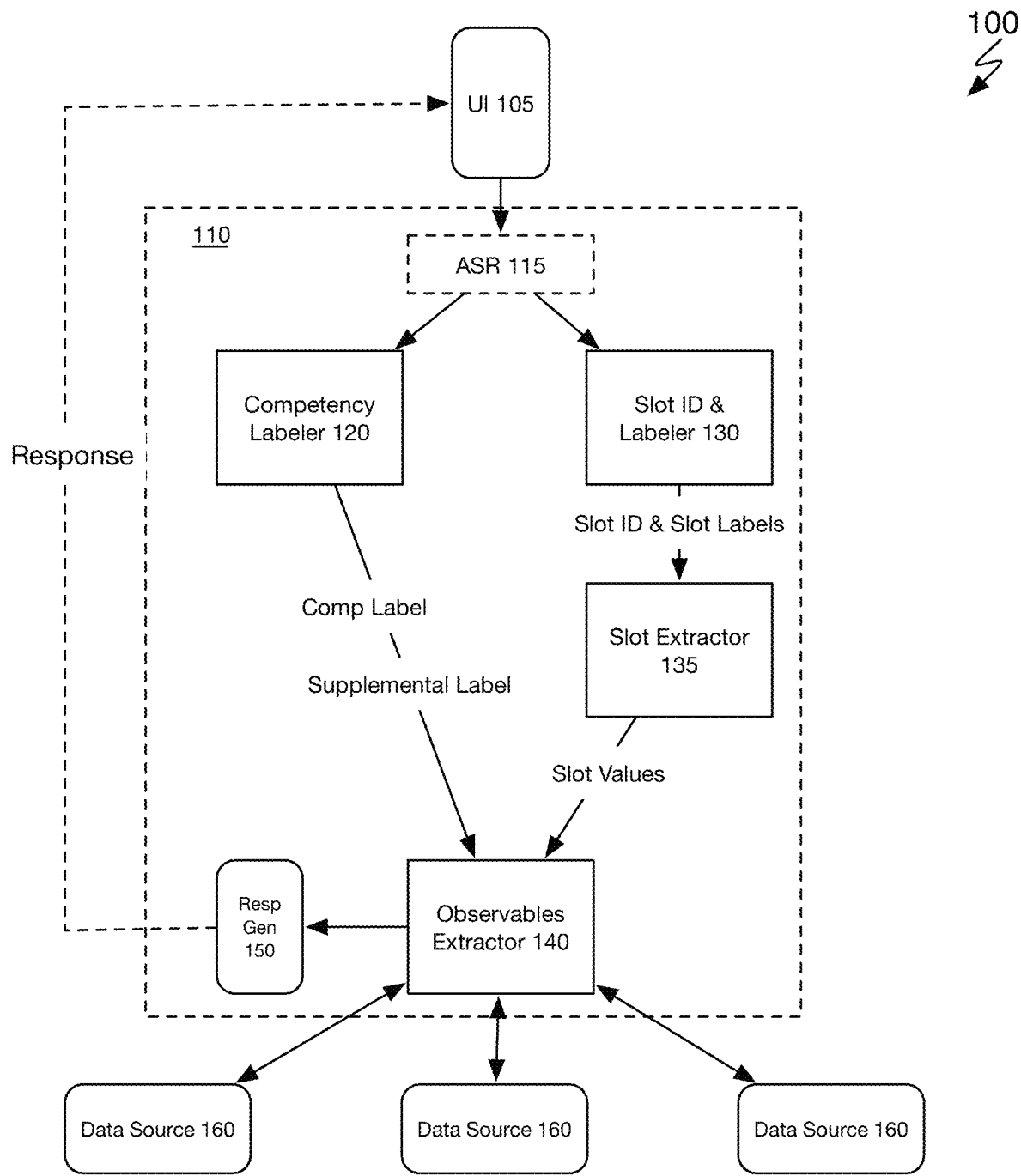
FIG. 1 illustrates a schematic representation of a system 100 in accordance with one or more embodiments of the present application.

The following description of the preferred embodiments of the present application are not intended to limit the inventions to these preferred embodiments, but rather to enable any person skilled in the art to make and use these inventions.

Overview

As discussed above, existing virtual assistant implementations do not have the requisite flexibility to address unrecognized queries or commands from user in which there are no predetermined rules designed around narrowly defined intents. This inflexible structure cannot reasonably and efficiently address the many variances in the manners in which a user may pose a query or command to the virtual assistant.

The embodiments of the present application, however, provide an artificially intelligent machine learning-based dialogue service and/or system with natural language processing capabilities that function to process and comprehend structured and/or unstructured natural language input from a user or input from any other suitable source and correspondingly provide highly conversant responses to dialogue inputs to the system. Using one or more trained (deep) machine learning models, such as long short-term memory (LSTM) neural network, the embodiments of the present application may function to understand any variety of natural language utterance or textual input provided to the system. The one or more deep machine learning models post deployment can continue to train using unknown and previously incomprehensible queries or commands from users. As a result, the underlying system that implements the (deep) machine learning models may function to evolve with increasing interactions with users and training rather than being governed by a fixed set of predetermined rules for responding to narrowly defined queries, as may be accomplished in the current state of the art.

Accordingly, the evolving nature of the artificial intelligence platform described herein therefore enables the artificially intelligent virtual assistant latitude to learn without a need for additional programming and the capabilities to ingest complex (or uncontemplated) utterances and text input to provide meaningful and accurate responses.

Additionally, systems and methods are provided that enable an intelligent curation of training data for machine learning models that enable a rapid and efficient training of machine learning models employed in a machine learning-based dialogue system.

Slot-filling Inconsistencies Overview

Data-driven slot-filling models in task-oriented dialog systems rely on carefully-annotated training data. However, annotations may often be performed by non-experts such as crowd workers, which can result in inconsistent and erroneous annotations. These issues may be resolved or partially mitigated by expert manual inspection, but such processes can be a time consuming and costly. In one or more embodiments of the present application, multiple inconsistency types identified in slot-filling annotations are defined. In some embodiments, one or more techniques for automatically identifying these inconsistencies introduced in the present application. In such embodiments, identifying and fixing such mistakes may lead to better performing slot-filling models downstream and an overall improvement in a quality of utterance data processing and response construction by a machine learning-based dialogue system, such as system 100 described in more detail below.

1. System for a Machine Learning-Based Dialogue System

Figure 1A:
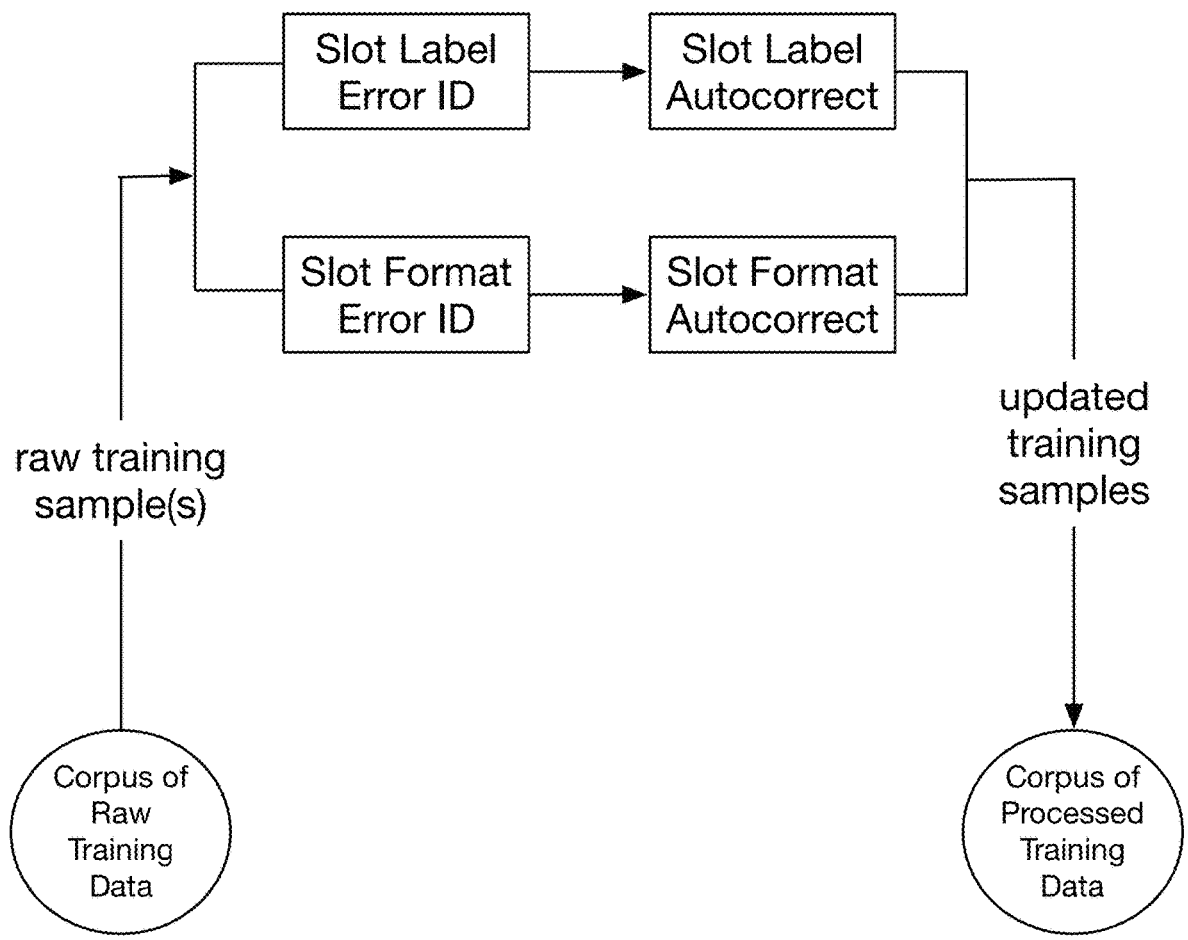
FIG. 1A illustrates a schematic representation of a sub-system of system 100 in accordance with one or more embodiments of the present application.

As shown in FIG. 1, a system 100 that automatically sources training data and trains and/or configures machine learning models includes an artificial intelligence (AI) virtual assistant platform 110 (e.g., artificially intelligent dialogue platform), a machine learning configuration interface 120, a training/configuration data repository 130, a configuration data queue 135, and a plurality of external training/configuration data sources 140. Additionally, the system 100 may include an anomaly detection sub-system 170 that may function to receive training data samples as input and identify slot format and/or slot label errors and automatically correct the slot format and/or the slot label errors, as shown by way of example in FIG. 1A.

Generally, the system 100 functions to implement the artificial intelligence virtual assistant platform 110 to enable intelligent and conversational responses by an artificially intelligent virtual assistant to a user query and/or user command input into the system 100, as described in U.S. patent application Ser. No. 15/797,414 and U.S. Pat. Nos. 10,572,801, 10,296,848, which are all incorporated herein in their entireties by this reference. Specifically, the system 100 functions to ingest user input in the form of text or speech into a user interface 160. At natural language processing components of the system 100 that may include, at least, the competency classification engine 120 the slot identification engine 130, and a slot value extractor 135, the system 100 functions to identify a competency classification label for the user input data and parse the user input data into comprehensible slots or segments that may, in turn, be converted into program-comprehensible and/or useable features. Leveraging the outputs of the natural language processing components of the system 100, the observables extractor 140 may function to generate handlers based on the outcomes of the natural language processing components and further, execute the generated handlers to thereby perform various operations that accesses one or more data sources relevant to the query or command and that also performs one or more operations (e.g., data filtering, data aggregation, and the like) to the data accessed from the one or more data sources.

The artificial intelligence virtual assistant platform 110 functions to implement an artificially intelligent virtual assistant capable of interacting and communication with a user. The artificial intelligence platform 110 may be implemented via one or more specifically configured web or private computing servers (or a distributed computing system; e.g., the cloud) or any suitable system for implementing the system 100 and/or the method 200.

In some implementations, the artificial intelligence virtual assistant platform no may be a remote platform implemented over the web (e.g., using web servers) that is configured to interact with distinct and disparate service providers. In such implementation, an event such as a user attempting to access one or more services or data from one or more data sources of the service provider may trigger an implementation of the artificially intelligent virtual assistant of the AI platform 110. Thus, the AI virtual assistant platform 110 may work in conjunction with the service provider to attend to the one or more queries and/or commands of the users of the service provider. In this implementation, the data sources 160 may be data sources of the service provider that are external data sources to the AI virtual assistant platform 110.

The competency classification engine 120 together with the slot identification engine 130 and the slot value extractor 135 preferably function to define a natural language processing (NLP) component of the artificial intelligence platform 110. In one implementation, the natural language processing component may additionally include the automatic speech recognition unit 105.

The competency classification engine 120 functions to implement one or more competency classification machine learning models to label user input data comprising a user query or a user command. The one or more competency classification machine learning models may include one or more deep machine learning algorithms (e.g., a recurrent neural network, etc.) that have been specifically trained to identify and/or classify a competency label for utterance input and/or textual input. The training input used in training the one or more deep machine learning algorithms of the competency classification engine 120 may include crowdsourced data obtained from one or more disparate user query or user command data sources and/or platforms (e.g., messaging platforms, etc.). However, it shall be noted that the system 100 may obtain training data from any suitable external data sources. The one or more deep machine learning algorithms may additionally be continually trained using user queries and user commands that were mispredicted or incorrectly analyzed by the system 100 including the competency classification engine 120.

The competency classification engine 120 may additionally be configured to generate or identify one competency classification label for each user query and/or user command input into the engine 120. The competency classification engine 120 may be configured to identify or select from a plurality of predetermined competency classification labels (e.g., Income, Balance, Spending, Investment, Location, etc.). Each competency classification label available to the competency classification engine 120 may define a universe of competency-specific functions available to the system 100 or the artificially intelligent assistant for handling a user query or user command. That is, once a competency classification label is identified for a user query or user command, the system 100 may use the competency classification label to restrict one or more computer-executable operations (e.g., handlers) and/or filters that may be used by system components when generating a response to the user query or user command. The one or more computer-executable operations and/or filters associated with each of the plurality of competency classifications may be different and distinct and thus, may be used to process user queries and/or user commands differently as well as used to process user data (e.g., transaction data obtained from external data sources 160).

Additionally, the competency classification machine learning model 120 may function to implement a single deep machine learning algorithm that has been trained to identify multiple competency classification labels. Alternatively, the competency classification machine learning model 120 may function to implement an ensemble of deep machine learning algorithms in which each deep machine learning algorithm of the ensemble functions to identify a single competency classification label for user input data. For example, if the competency classification model 120 is capable of identifying three distinct competency classification labels, such as Income, Balance, and Spending, then the ensemble of deep machine learning algorithms may include three distinct deep machine learning algorithms that classify user input data as Income, Balance, and Spending, respectively. While each of the deep machine learning algorithms that define the ensemble may individually be configured to identify a specific competency classification label, the combination of deep machine learning algorithms may additionally be configured to work together to generate individual competency classification labels. For example, if the system receives user input data that is determined to be highly complex (e.g., based on a value or computation of the user input data exceeding a complexity threshold), the system 100 may function to selectively implement a subset (e.g., three machine learning algorithms from a total of nine machine learning algorithms or the like) of the ensemble of machine learning algorithms to generate a competency classification label Additionally, the competency classification engine 120 may be implemented by the one or more computing servers, computer processors, and the like of the artificial intelligence virtual assistance platform 110.

The slot identification engine 130 functions to implement one or more machine learning models to identify slots or meaningful segments of user queries or user commands and to assign a slot classification label for each identified slot. The one or more machine learning models implemented by the slot identification engine 130 may implement one or more trained deep machine learning algorithms (e.g., recurrent neural networks). The one or more deep machine learning algorithms of the slot identification engine 130 may be trained in any suitable manner including with sample data of user queries and user commands that have been slotted and assigned slot values and/or user system derived examples. Alternatively, the slot identification engine 130 may function to implement an ensemble of deep machine learning algorithms in which each deep machine learning algorithm of the ensemble functions to identify distinct slot labels or slot type labels for user input data. For example, slot identification engine 130 may be capable of identifying multiple distinct slot classification labels, such as Income, Account, and Date labels, then the ensemble of deep machine learning algorithms may include three distinct deep machine learning algorithms that function to classify segments or tokens of the user input data as Income, Account, and Date, respectively.

A slot, as referred to herein, generally relates to a defined segment of user input data (e.g., user query or user command), a training data sample, an utterance sample or the like that may include one or more data elements (e.g., terms, values, characters, media, etc.). Accordingly, the slot identification engine 130 may function to decompose a query or command into defined, essential components that implicate meaningful information to be used when generating a response to the user query or command.

A slot label which may also be referred to herein as a slot classification label may be generated by the one or more slot classification deep machine learning models of the engine 130. A slot label, as referred to herein, generally relates to one of a plurality of slot classification labels that generally describes a slot (or the data elements within the slot) of a user query or user command. The slot label may define a universe or set of machine or program-comprehensible objects that may be generated for the data elements within an identified slot.

Like the competency classification engine 120, the slot identification engine 130 may implement a single deep machine learning algorithm or an ensemble of deep machine learning algorithms. It shall be recognized that the slot identification engine may function to implement any suitable machine learning model and/or algorithm, including, but not limited to, a conditional random field (CRF) for performing slot-filling tasks and the like. Additionally, the slot identification engine 130 may be implemented by the one or more computing servers, computer processors, and the like of the artificial intelligence virtual assistance platform 110.

The machine learning models and/or the ensemble of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomizer 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in implementing the artificially intelligent virtual assistant and/or other components of the system 100.

The slot value extraction unit 135 functions to generate slot values by extracting each identified slot and assigned slot label of the user query or user command and converting the data elements (i.e., slot data) within the slot to a machine or program-comprehensible object or instance (e.g., term or value); that is, the slot label is mapped to coding or data that a computer or program of the system 100 comprehends and is able to manipulate or execute processes on. Accordingly, using the slot label generated by the slot identification engine 130, the slot extraction unit 135 identifies a set or group of machine or program-comprehensible objects or instances that may be applied to slot data of a slot assigned with the slot label. Thus, the slot extraction unit 135 may convert the slot data of a slot to a machine or program-comprehensible object (e.g., slot values) based on the slot label and specifically, based on the available objects, instances, or values mapped to or made available under the slot label.

The observables extractor 140 functions to use the slot values comprising the one or more program-comprehensible objects generated at slot extraction unit 135 to determine or generate one or more handlers or subroutines for handling the data of or responding to the user query or user command of user input data. The observables extractor 140 may function to use the slot values provided by the slot extraction unit 135 to determine one or more data sources relevant to and for addressing the user query or the user command and determine one or more filters and functions or operations to apply to data accessed or collected from the one or more identified data sources. Thus, the coding or mapping of the slot data, performed by slot extraction unit 135, to program-comprehensible objects or values may be used to specifically identify the data sources and/or the one or more filters and operations for processing the data collected from the data sources.

The response generator 150 functions to use the competency classification label of the user input data to identify or select one predetermined response template or one of a plurality of predetermined response templates. For each competency classification label of the system 100, the system 100 may have stored a plurality of response templates that may be selected by the response generator 150 based on an identified competency classification label for user input data. Additionally, or alternatively, the response template may be selected based on both the competency classification label and one or more generated slot values. In such instance, the one or more slot values may function to narrow the pool of response template selectable by the response generator to a subset of a larger pool of response templates to consider the variations in a query or user command identified in the slot values. The response templates may generally a combination of predetermined output language or text and one or more input slots for interleaving the handler outputs determined by the observables extractor 140.

The user interface system 105 may include any type of device or combination of devices capable of receiving user input data and presenting a response to the user input data from the artificially intelligent virtual assistant. In some embodiments, the user interface system 105 receives user input data in the form of a verbal utterance and passes the utterance to the automatic speech recognition unit 115 to convert the utterance into text. The user interface system 105 may include, but are not limited to, mobile computing devices (e.g., mobile phones, tablets, etc.) having a client application of the system 100, desktop computers or laptops implementing a web browser, an automated teller machine, virtual and/or personal assistant devices (e.g., Alexa, Google Home, Cortana, Jarvis, etc.), chatbots or workbots, etc. An intelligent personal assistant device (e.g., Alexa, etc.) may be any type of device capable of touchless interaction with a user to performing one or more tasks or operations including providing data or information and/or controlling one or more other devices (e.g., computers, other user interfaces, etc.). Thus, an intelligent personal assistant may be used by a user to perform any portions of the methods described herein, including the steps and processes of method 200, described below. Additionally, a chatbot or a workbot may include any type of program (e.g., slack bot, etc.) implemented by one or more devices that may be used to interact with a user using any type of input method (e.g., verbally, textually, etc.). The chatbot or workbot may be embedded or otherwise placed in operable communication and/or control of a communication node and thus, capable of performing any process or task including, but not limited to, acquiring and providing information and performing one or more control operations.

2. Method for Automatically Detecting and Repairing Slot Errors & Inconsistencies in Training Data FIG. 2 illustrates an exemplary method 200 for detecting annotation discrepancies in training data for automatically categorizing and/or recategorizing training data for use within and improving a machine-learned based dialogue system. The method 200, in some embodiments, includes optionally gathering and compiling annotated and/or labeled data S210, identifying inconsistent or erroneous slot format S220, deriving or building a slot span format evaluator S230, identifying one or more annotation errors or inconsistencies in one or more slot labels S240, implementing a variation n-gram method S250. Optionally, the method 200 may optionally include synthesizing an application of the slot format evaluator and the slot label variation evaluator S260.

In one or more embodiments of the present application, the method 200 preferably enables an intelligent, automatic correction of labeled or annotated data that may be subject to multiple types or categories of errors, inconsistencies or misclassifications. The method 200 may function to automatically characterize an archetypal or prototypical slot pattern that may incorporate one or more of a slot's format, content, length in number of words or tokens, type of token, or any other suitable input or parameter. Such a characterization may function to check and/or validate slot annotations within a dataset to ensure consistency and correctness of the labeled slots.

Accordingly, the method 200 functions to implement a procedure to increase the ease and computational efficiency of processes that may involve correcting errors in annotation or labelling. Additionally, the method 200 may function to increase the performance of a machine learning model as measured by accuracy, precision, recall, F1 score, or any other suitable metric by increasing the fidelity of the labels or annotations of the training data corpus or corpora.

2.1 Sourcing and/or Gathering Training Sample Data

Optionally, or alternatively, S210, which includes sourcing machine learning training data from one or more training data sources, may function to collect machine learning training data from one or more of a plurality of internal and/or external (e.g., third-party) sources of training data. In some embodiments, the method 200 may function to source and/or collect training data implementing the methods and/or systems described in U.S. Pat. No. 10,296,848, which is incorporated in its entirety by this reference.

In a preferred embodiment, the machine learning training data from an external machine learning training data source comprises a plurality of labeled training samples proliferated based on or using the input of seed machine learning data samples. Accordingly, the machine learning training data returned from the external machine learning training data source may include a large number (e.g., hundreds, thousands, millions, etc.) of labeled data samples that are variants of the seed machine learning data samples. That is, the labeled data samples returned by the external or internal training data source may have the same or similar meanings to one or more of the example user queries, example utterances, and/or one or more examples user prompts.

Additionally, S210 preferably functions to source the machine learning training data from the external or internal training data sources and the internal training data sources, in parallel. That is, S210 may function to collect machine learning training data from each of the plurality of external or internal training data sources and possibly one or more internal training data sources at the same time without waiting for any one external or internal training data source to provide a completed corpus of training data samples.

Additionally, or alternatively, S210 may function to store the collected machine learning training data from each of a plurality of external or internal machine learning training data sources in disparate datastores. That is, S210 may configure a distinct and separate datastore for receiving and storing machine learning training data for each of the plurality of external or internal machine learning training data sources. In this way, specific processing of the machine learning training data may be performed on a per training data source basis.

Additionally, or alternatively, S210 may function to store the collected machine learning training data from the plurality of external or internal machine learning training data sources in a single datastore. In some embodiments, all machine learning training data may be mixed together or combined. Alternatively, S210 may function to augment the machine learning training data with metadata that identifies from which external or internal machine learning training data source that a labeled data sample originated from.

Additionally, or alternatively, S210 may function to store the collected machine learning training data in one or more training data queues. The one or more training data queues may function to store the collected machine learning training data for a predefined period. In some embodiments, unless one or more machine learning training data samples are pruned or extracted from the one or more training data queues, S210 may function to automatically load the training data in the one or more training data queues directly into a corresponding or assigned machine learning model. That is, the training data in the queues may be used by the live machine learning system to generate one or more live machine learning classification labels or the like. The predefined period may be set to any suitable period that preferably enables an opportunity for a processing system to evaluate and refine the training data samples from the external or internal training data sources.

Additionally, or alternatively, S210 may implement one or more thresholds for each of the plurality of external or internal training data sources that may function to limit an amount of training data that may be collected from each of the plurality of external or internal training data sources. Once S210 detects that a limit or threshold is met for a specific external or internal training data source, S210 may cease collecting or accepting training data from the specific external or internal training data source and may further, signal the specific external or internal training data source to stop transmitting machine learning training data to the machine learning-based dialogue service.

The limits or thresholds for each of the plurality of external or internal training data sources may be preset (e.g., may be an input value at the configuration console) or dynamic and may be different for each of the plurality of external or internal training data sources. For instance, a training data limit or training data threshold for each of the plurality of external or internal training data sources may be set based on a calculated level of quality assigned to each of the plurality of external or internal training data sources. The level of quality preferably relates to an accuracy of labels generated by the external or internal training data source for each labeled training data sample provided thereby. Thus, a higher calculated level of quality of training data for a given external or internal training data source may enable a higher limit or threshold for receiving labeled training data samples. For instance, a first external or internal training data source may have a high level of quality (judged based on a scale of 0-10, e.g., 8 level of quality or the like) and thus, assigned a high threshold (e.g., 1000 samples or the like). A second external or internal training data source may have a low level of quality (e.g., 2 level of quality, etc.) and thus, assigned a low threshold (e.g., 100 samples or the like).

Additionally, or alternatively, a new observation preferably relates a data set or a piece of data on which a machine learning model has not previously been trained.

In some embodiments, a source of the new observation data in S210 may include proprietary data collected from deployed (i.e., in production systems or production logs) virtual agents in a production environment. For example, data from a system in use may be recorded and used for this purpose.

In another implementation, in the absence of a deployed virtual agent, or in the interest of broadening a training sample dataset, data may be collected by means of requesting and recording new relevant interactions specific to the domain and type of training data desired for training one or more models. This could include hiring agents to perform novel interactions, using pre-existing datasets (e.g., movie scripts, etc.) or any other method of generating new data.

Additionally, or alternatively, training data may be required to be labeled and/or annotated in order to be used in the training process. In one implementation, data may be labeled and/or annotated by humans trained to perform such a task, in a centralized location such as a datacenter with on-site workers, or in a distributed manner such as crowdsourcing, e.g. leveraging a platform such as Amazon Turk.

2.2 Slot Annotation Error or Inconsistency Identification

S220, which includes detecting or identifying inconsistent or erroneous slot format (e.g., a slot segment defect, etc.), may function to identify and/or correct slot format inconsistencies of one or more training samples. That is, S220 may function to automatically determine whether one or more structures of one or more slot types of a training sample may not be correctly annotated. In one or more embodiments, S220 may include evaluating each of a plurality of distinct training samples of a corpus of raw machine learning training data for slot format compliance and/or discrepancies. As referred to herein, raw machine learning training data preferably relates to machine learning training data that may not have been evaluated, processed, and/or approved to be used in a formal training process flow for a deployable machine learning model.

2.2.1 Slot Format Errors or Inconsistencies

S220, which may include identifying one or more annotation inconsistencies or errors within the format of a slot span of a given training sample, may function to evaluate each distinct slot span of a given training sample and identify whether the slot span includes one or more slot annotation errors or slot annotation inconsistencies. Thus, if a given training sample, includes multiple annotated slot spans, S221 may function to individually evaluate each of the multiple annotated slot spans (possibly in parallel) of the training sample for slot span-related errors or inconsistencies.

A. Slot Format Inconsistency

In some embodiments, a first slot span discrepancy type may include a slot format error and/or a slot format inconsistency. A slot format error or inconsistency may relate to instances in which certain tokens of a given training sample being inconsistently or incorrectly included or excluded in an annotated slot span. That is, slot format errors or inconsistencies may occur when the structure or a category (e.g., label or annotation) of a slot span may not be applied or may not be annotated in a consistent manner relative to a plurality of or a majority of other slots within a given corpus of training data or relative to a predetermined standard for slot span annotation. In a non-limiting example, in an attempt to properly label a slot span with an ACCOUNT slot label of a given training sample, such as "to my checking account please", it is possible that multiple distinct annotations to the tokens of this training sample may arise. For instance, it may be possible that the ACCOUNT slot classification label is applied only to the slot span of "my checking account" having three potential tokens while a different annotation of a slot span of the same or similar training sample annotates the slot span having only two tokens "checking account" with the ACCOUNT slot classification label and yet another annotates the token span having only one token of "checking" of the training sample with the ACCOUNT slot classification label rendering these annotations using the same slot classification label of these distinct slot spans inconsistent. That is, the application of the slot classification label of ACCOUNT may be the proper slot span category or slot classification label, however, the slot classification label is applied variably to different slot span lengths.

Accordingly, in some embodiments, the slot span inconsistency or slot span error may be that a given slot labeling of a slot span excludes one or more pertinent tokens (i.e., a token that should be included in a proper annotation of a slot span) and/or that the given slot labeling of the slot span includes one or more extraneous tokens (i.e., a token that should not be included in a proper annotation of slot span). Depending on the nature of the downstream task for which slot-filling is being used, the presence or absence of certain tokens in an extracted slot may affect overall dialog system performance.

B. Chop and Join Error

In one or more embodiments, a second and third slot span discrepancy type may include chop, and join errors or inconsistencies, respectively. A chop inconsistency or error may relate to a token span being labeled as multiple annotations when a single annotation is appropriate or preferred according to a predetermined slot span labeling technique or the like. A join inconsistency or error may relate to a token span being labeled as one continuous slot annotation when in fact, several annotations are appropriate or preferred. That is, chop and join may occur when a particular slot type spans multiple tokens without consistency about whether a single or multiple labels are applied to the sub spans (e.g. "Canadian dollars" vs. "Mexican" "pesos").

Accordingly, as evaluated, S221 may identify that a given training sample includes one or more extraneous slot labels to one or more slot spans of the given training sample and/or that the given training sample may be missing one or more pertinent slot labels to one or more slot spans of the given training sample. In one or more embodiments, an extraneous nature and/or a pertinent nature of one or more distinct slot classification labels may be determined based on a predetermined slot labeling technique or scheme, which may be defined by the machine learning-based dialogue service or the like. In such embodiments, the predetermined slot labeling technique may include instructions for setting or configuring proper slot span lengths and associated instructions for setting or applying one or more distinct slot classification labels to given slot spans.

2.3 Slot Format Evaluator

S230, which includes deriving or building a slot span format evaluator (checker), may function to constructs one or more archetypal or prototypical slot span formats for one or more distinct slot spans of a corpus of training data and/or builds a slot span algorithm that detects one or more slot format inconsistencies or errors within training samples of a corpus of training data. In one or more embodiments, a slot span format evaluator may be training data corpus-specific, in that, for each distinct corpus of training data, a distinct slot span format evaluator may be derived and applied against the training samples of the distinct corpus. In such embodiments, in deriving a slot span evaluator, the most common or prevalent slot span formats within a distinct corpus of training data may be used to define or inform a design or architecture of a slot span evaluator for the distinct corpus.

In one or more embodiments, S230 may function to evaluate each annotated training sample of a corpus or a corpora of annotated training data and attempt to find scenarios in the corpus or the corpora where a labeled slot span exists next to an unlabeled token or token span. In one embodiment, S230 may function to identify instances in the corpus of annotated training sample data wherein a token or token span may be inconsistently or erroneously annotated as belonging to a slot span, defined as extraneous tokens or extraneous token spans. In another embodiment, S230 may function to separately or in addition to identify instances in the corpus of annotated training sample data wherein a token or token span may be inconsistently or erroneously annotated as not belonging to a slot span, defined as pertinent tokens or pertinent token spans.

It shall be noted that the slot format evaluator in S230 may be implemented in or as a part of the identification of the slot format error or inconsistency in S220.

In a preferred embodiment, S230 may function to implement a voting scheme that may function to form a policy suggestion to either remove an extraneous token or extraneous token span or add a pertinent token or pertinent token span from or to a labeled slot span, respectively. That is, in such embodiments, a candidate token (i.e., a token under evaluation) that is adjacent to a labeled slot span, but currently excluded, may be added to the labeled slot span if S230 determines that the majority of candidate-slot pairs of a slot-type within a given corpus occur labeled as part of the slot span in the dataset. Conversely, in some embodiments, a candidate token that may be positioned at a beginning or at an end of a target labeled slot span may be removed or extracted from the labeled slot span if S230 (via the slot span format evaluator) determines that the majority or plurality of candidate slot pairs of distinct slot-type within a given corpus do not occur as a labeled part of the slot spans of the slot-type within the corpus. Accordingly, S230 may function to define a new archetypal slot span or prototypical slot span to expand an annotation of the slot span in a direction towards the pertinent token to properly include the pertinent token that was erroneously excluded from the labeled slot span or contract an annotation of the slot span in a direction that excludes (i.e., towards a middle or body of the slot span to properly exclude the extraneous token that was erroneously included within the labeled slot span.

Conversely, if a candidate token that is included at either end of a labeled slot span may be removed from the labeled slot span if S230 determines that the majority of candidate-slot pairs of a slot-type within a given corpus may not occur as a labeled part of the slot span in the given corpus. Accordingly, S230 may function to contract an annotation to the slot span in a direction of the extraneous token to properly exclude the extraneous token that was erroneously included in the label slot span.

In a preferred embodiment, the slot span format evaluator may include the use of an n-gram structure for evaluating tokens within training samples and identifying one or more tokens in a given training sample as either a candidate for inclusion or exclusion from a given slot span. As mentioned above, a voting scheme or token inclusion/exclusion technique may be implemented to further determine whether a candidate token may be formally removed or formally added to a given slot span of a training sample. Specifically, in such embodiments, S230 may function to build specific types of n-grams for evaluating a given slot span of a training sample, defined as left- and right-n-gram sets. An n-gram preferably relates to a series of a finite number (n) of tokens from a given sample. A left n-gram set preferably relates to a set of token sequences that may exclude the last token in the n-gram. For example, a valid left n-gram set of the n-gram "my premier savings account" is {"my", "premier", "savings", "my premier", "premier savings", "my premier savings"}. Similarly, a right n-gram set preferably relates to the set of token sequences that exclude the first token in the n-gram.

Additionally, or alternatively, S230 may include combining a left n-gram set and a right n-gram set into a left- and right n-gram sets thereby defining a comprehensive slot span evaluator for a given corpus that may function to evaluate in parallel a slot span format along a left and a right of slot span in parallel.

In a preferred embodiment, the slot format checker may function to automatically construct left- and right n-gram sets for each potential slot type, the elements of which may serve as a lexicon upon which to identify the archetypal slot formats to identify extraneous and/or pertinent tokens and token spans.

In a preferred embodiment, the slot format checker may be applied with both left and right n-gram sets individually to each slot type in the corpus, yielding policy suggestions that attempt to maximize slot format consistency within each slot type in the corpus.

2.4 Slot Label Errors or Inconsistencies

S240, which includes identifying one or more annotation errors or inconsistencies in one or more slot labels of a given training sample, may function to evaluate each distinct slot label of the training sample and identify whether the one or more slot labels annotated to one or more slot spans of the training sample include slot label errors or slot label inconsistencies.

A. Omission Inconsistencies

In some embodiments, a first type of slot label inconsistency and/or error may include an Omission Inconsistency or an Omission Error, which may occur when a token or span of tokens should be labeled with a certain slot label, but is not. That is, Omission Inconsistencies may occur when an unlabeled span should be labeled as a slot, as shown by way of example in FIG. 3. For example, if a token "checking account" should be labeled as SOURCE slot, but it is not may amount to an Omission Inconsistency or Omission Error. While in practice it may be challenging to identify omissions, in one implementation an Omission Inconsistency may be identified for an unannotated span of tokens if the preponderance or a threshold amount of the annotated training sample data of a given corpus of training samples indicate that the span under evaluation is labeled with a certain slot label.

B. Addition Inconsistencies

Figure 3:
FIG. 3 illustrates a schematic representation of slot format and/or slot labeling discrepancies in accordance with one or more embodiments of the present application.

In one or more embodiments, a second type of slot label inconsistency and/or error may include an Addition Inconsistency, which may occur when a token or span of tokens is labeled with a slot label but should be unlabeled, as shown by way of example in FIG. 3. That is, Addition Inconsistencies may occur when a labeled span should not be labeled thereby defining an extraneous slot label. For example, in the phrase "please start checking my savings account", if the token "checking" is labeled as an ACCOUNT, this may be considered an erroneous annotation, as "checking" in this instance does not refer to a type of financial account but possibly a requested action.

In one or more embodiments, the Addition Inconsistency may be equally applicable to one or more tokens that may be erroneously added to a target annotated slot span and therefore, should be removed.

C. Wrong Label Inconsistencies

In some embodiments, a third type of slot label inconsistency and/or error may include a "Wrong Label" Inconsistency, which may occur when a token span is annotated with the wrong slot label, as shown by way of example in FIG. 3. That is, Wrong Label Inconsistencies occur when a token span is labeled as a one slot type but should be labeled as another slot type. For a given corpus of raw training samples of data, a plurality of distinct slot labels may be applicable to a plurality of distinct slot types within the given corpus. Mislabeling of a slot span may occur because of confusion in a use of a token within a training sample, a misunderstanding of a context surrounding a slot span, and the like. For example, in the phrase "transfer 30 dollars please" if the token span "30 dollars" is labeled as an ACCOUNT slot, but this is not accurate because the token span "30 dollars" may not accurately reflect or inform a financial account. In a preferred embodiment, the Wrong Label Inconsistency may be considered distinct from the Omission Inconsistency in that a label may not be missing in the case of the wrong label.

D. Swapped Label Inconsistencies

In one or more embodiments, a sub-type or special case of the Wrong Label Inconsistency may include a Swapped Label Inconsistency, which may occur when two token spans in a training sample have wrong labels for a given annotation scheme, and where the wrong label of one of the two token spans is the correct label for the other, as shown by way of example in FIG. 3. That is, swapped labels inconsistency may occur when the labels of a pair of annotated slots ought to be swapped, such that a first slot span of the pair may be augmented with the annotations of the second slot span of the pair and similarly, the second slot span of the pair may be augmented with annotations of the first slot span, which effectively swaps the label to be in a correct position along the multiple distinct slot spans of a training sample. Swapped labels may frequently occur (but are not limited to occurring) when two slot types share the same entity domain (e.g. to- and from airports are both airports). For example, in the phase "show me flights from New York to Berlin", if the token span "New York" is labeled as the TO-AIRPORT, and "Berlin" as the FROM-AIRPORT slot, this could be considered a Swapped Label Inconsistency.

2.5 Slot Label Variation Evaluator

S250, which includes implementing a variation n-gram method, may function to set a variation n-gram algorithm that may function to evaluate one or more slot labels annotated to one or more slot spans of a given training sample in order to determine if any of the above slot label variations may be present. In a preferred embodiment, S224 implements a variation n-gram method to find all n-grams of a fixed radius of k tokens centered around an annotated slot, which is sometimes may be referred to herein as a slot nucleus. In such embodiments, the n-gram centered around the slot nucleus may be referred to as a variation n-gram. Where k relates to a number of tokens. In a second embodiment, S250 may function to consider a dynamic radius in the circumstances in which the slot nucleus may be surrounded with more tokens on one side than the other.

It shall be noted that the slot label evaluator in S250 may be implemented in or as a part of the identification of the slot label error or inconsistency in S230.

In one or more embodiments, in training samples wherein the slot labels (or an absence of a slot label) attached to a designated slot nuclei of the training sample differ from a majority may be marked as inconsistent or erroneous.

Additionally, or alternatively, S250, which includes implementing a variation n-gram, may function for a given training sample [1] set a slot nucleus (in some embodiments, S226 may function to sequentially move along the training sample to reset to a new slot nucleus), [2] set a fixed radius k of tokens from the slot nucleus, [3] identify all variation n-grams (i.e., sentence fragments) [4] identify a consistent labeling convention from a majority vote among samples in a subject dataset, and [5] evaluating non-annotations and annotations agreements between sentence fragments defined by the variation n-gram. That is, if the voting stage determines a convention, samples with annotations that do not match that convention are flagged as being inconsistently or erroneously annotated in item [5].

2.6 Error Correction Synthesis

Optionally, or alternatively, S260 may function to combine, aggregate, or synthesize an application of the slot format evaluator and the slot label variation evaluator together against one or more training samples of a given corpus of raw training data. In a preferred implementation, multiple methods of error correction synthesis or aggregation may be used in some combination.

In one embodiment, S260 may function to perform the error correction steps for the slot format evaluator and the slot label variation in series (i.e. one at a time), in a specified order, over an entire data corpus.

In another embodiment, S260 may function to partition the dataset into two or more portions, which may include "train" and "evaluate" sets or splits using any suitable algorithm including, but not limited to, a CRF algorithm, long-short-term memory (LSTM) algorithm, and/or the like. In some embodiments, a conditional random field (CRF) may be trained on the train set, and subsequently tested on the evaluate set. Samples where the CRF predicts different output than the annotated labels may be marked as possible inconsistencies. S260 may function to perform the train and evaluate split procedure is repeated until all samples have been evaluated.

In another embodiment, S260 may function to apply a combined evaluator in parallel such that both the slot format and the slot labels of a given training sample may be evaluated at the same time.

In another embodiment, S260 may function to apply a combined evaluator in an intelligent sequence such that a first evaluator of the combined pair may be applied against a given training sample that may inform an intelligent application of a second evaluator of the combined pair.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A method for automatically detecting annotation discrepancies in annotated training data samples and repairing the annotated training data samples for a machine learning-based automated dialogue system, the method comprising:
   constructing a slot span format evaluator for a target annotated slot span based on span format attributes of one or more of a plurality of distinct training data samples of a corpus, wherein constructing the slot span format evaluator includes:
   defining a left- and right n-gram set for a slot type of the target annotated slot span, wherein the slot type relates to one of a plurality of distinct slot classification labels;
   evaluating the corpus of the plurality of distinct training data samples;
   identifying one or more of a slot span defect and a slot label defect of the target annotated slot span of a target training data sample of the corpus based on the evaluation; and
   automatically correcting one or more annotations of the target annotated slot span based on the identified one or more of the slot span defect and the slot label defect;
   training one or more machine learning models using the corpus;
   implementing the one or more machine learning models to compute one or more inferences or predict one or more classifications based on utterance data input to the machine learning-based automated dialogue system; and
   generating a response by the machine learning-based dialogue system based on the one or more inferences or the one or more classifications of the utterance data input.

2. The method according to claim 1, wherein
automatically correcting the one or more annotations of the target annotated slot span includes one of:
   automatically expanding the target annotated slot span to include one or more surrounding tokens based on identifying the slot span defect; and
   automatically contracting the target annotated slot span to exclude one or more tokens within the annotated slot span based on detecting the slot span defect.

3. The method according to claim 1, wherein
automatically correcting the one or more annotations of the target annotated slot span includes one or more of:
   deleting one or more erroneous slot labels from the target annotated slot span based on identifying the slot label defect, and
   annotating to the target annotated slot span a proper slot label based on slot labels applied to a majority of like slot spans within the corpus.

4. The method according to claim 1, wherein
the slot span defect relates to an error or an inconsistency in a setting of a length of a given annotated slot span of a given training data sample, wherein the length of the given annotated slot span is set such that the given annotated slot span erroneously includes one or more extraneous tokens or erroneously excludes one or more pertinent tokens of the given training data sample.

5. The method according to claim 1, wherein
the slot label defect relates to an error or an inconsistency in an application of one or more distinct slot classification labels to a given annotated slot span of a given training data sample.

6. The method according to claim 1, wherein:
a given left n-gram set of the left- and right n-gram set comprises a set of token sequences that excludes a last token in an n-gram,
a given right n-gram set of the left- and right n-gram sets comprises a set of token sequences that excludes the first token in the n-gram, and
the n-gram is a sequence of tokens of a given training data sample within the corpus of annotated training samples.

7. The method according to claim 1, wherein:
evaluating the corpus of the plurality of distinct training data samples includes iterating the slot format evaluator over each of the plurality of distinct training data samples within the corpus, wherein iterating the slot format evaluator includes:
   identifying whether a segment of a given annotated slot span of a given training data sample is positioned adjacent to an un-labeled span of the given training data sample having a member token within the left- and right n-gram set for a slot type of the given annotated training data sample; and
   if the segment of a given annotated slot span is adjacent to the un-labeled span that includes the member token, identifying the member token as a candidate for inclusion into the given annotated slot span.

8. The method according to claim 7, wherein
evaluating the corpus of the plurality of distinct training data samples includes:
   implementing a voting stage that informs a candidate exclusion policy or a candidate inclusion policy for the member token, wherein the voting stage includes:
      identifying candidate-slot pairs from within the corpus, wherein each candidate-slot pair includes a pairing of the member token with an adjacent token as found throughout distinct training data samples within the corpus,
   wherein the voting stage informs the candidate inclusion policy if a majority of candidate-slot pairs occur labeled as part of a single slot span thereby adding the member token to the given annotated slot span.

9. The method according to claim 8, further comprising:
designating the given annotated slot span as an archetypal slot span for the slot type of the target annotated slot span, and
identifying whether the target annotated slot span includes the slot span defect is based on a comparison of the target annotated slot span to the archetypal slot span.

10. The method according to claim 1, wherein:
evaluating the corpus of the plurality of distinct training data samples includes iterating the slot format evaluator over each of the plurality of distinct training data samples within the corpus, wherein iterating the slot format evaluator includes:
   identifying whether a given annotated slot span is positioned adjacent to an un-labeled span not having a member token within the left- and right n-gram set for a slot type of the given annotated slot span; and if the given annotated slot span is adjacent to the un-labeled span that does not include the member token, identifying a token within the given annotated slot span that is adjacent to the un-labeled slot span as a candidate for exclusion from the given annotated slot span.

11. The method according to claim 10, wherein
evaluating the corpus of the plurality of distinct training data samples includes:
  implementing a voting stage that informs a candidate exclusion policy or a candidate inclusion policy for the member token, wherein the voting stage includes:
    identifying candidate-slot pairs from within the corpus, wherein each candidate-slot pair includes a pairing of the member token with an adjacent token as found throughout the plurality of distinct training data samples within the corpus,
  wherein the voting stage informs the candidate exclusion policy if a majority of candidate-slot pairs do not occur labeled as part of a single annotated slot span thereby excluding the member token from the given annotated slot span.

12. The method according to claim 11, further comprising:
  designating the given annotated slot span as an archetypal slot span for the slot type of the target annotated slot span, and
  identifying whether the target annotated slot span includes the slot span defect is based on a comparison of the target annotated slot span to the archetypal slot span.

13. The method according to claim 5, further comprising:
  implementing a label variation evaluator, wherein the label variation evaluator includes a variation n-gram that identifies whether there is the slot label defect in the given annotated training data sample, wherein implementing the label variation evaluator includes:
    (1) setting the given annotated slot span as a slot nucleus;
    (2) setting a fixed radius, k, around the nucleus, where k is a predetermined number of tokens; and
    (3) identify all variation n-grams for the given training sample based on the slot nucleus and fixed radius, k, wherein each identified variation n-gram includes an n-gram that includes a combination of the slot nucleus and one or more tokens surrounding the slot nucleus within a given training data sample.

14. The method according to claim 13, further comprising:
  implementing a voting stage that identifies whether a standard labeling convention for the variation n-gram exists within the corpus of annotated training sample data, wherein the standard labeling convention exists if a majority of annotated training data samples having the variation n-gram within the corpus include a distinct slot classification label,
  wherein if the standard labeling convention exists, the label variation evaluator determines whether the slot label annotated to the given training data sample is defective.

15. The method according to claim 13, wherein
if the slot label annotated to the given training data sample is defective, automatically repairing an annotation of the given annotated slot span to remove the slot label and ascribe a new slot label defined by the standard labeling convention to the given annotated slot span.

16. The method according to claim 1, wherein
the slot span defect includes one or more identified slot span defect types including one or more of:
  an omission inconsistency; and
  an addition inconsistency.

17. The method according to claim 16, wherein
automatically correcting the one or more annotations of the target annotated slot span is further based on the one or more identified slot span defect types.

18. The method according to claim 1, wherein
the slot label defect includes one or more identified slot label defect types including one or more of:
  a wrong label inconsistency;
  a swapped label inconsistency; and
  a chop and join inconsistency.

19. The method according to claim 18, wherein
automatically correcting the one or more annotations of the target annotated slot span is further based on the one or more identified slot label defect types.

* * * * *